(12) United States Patent
Haase

(10) Patent No.: US 8,342,227 B2
(45) Date of Patent: Jan. 1, 2013

(54) SUNSHADE

(75) Inventor: Charles Stephen Haase, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 111 days.

(21) Appl. No.: 12/869,850

(22) Filed: Aug. 27, 2010

(65) Prior Publication Data

US 2012/0049563 A1    Mar. 1, 2012

(51) Int. Cl.
*B60J 1/20* (2006.01)
*B60J 3/00* (2006.01)
*B60J 11/00* (2006.01)

(52) U.S. Cl. .................. 160/370.22; 296/97.8
(58) Field of Classification Search .................. 160/108, 160/120, 121.1, 122, 237, 25, 370.22, 50, 160/63, 56, 61, 87, 88, 89; 296/97.8
See application file for complete search history.

(56) References Cited

U.S. PATENT DOCUMENTS

| | | | |
|---|---|---|---|
| 2,546,843 A | 3/1951 | Zigterman | |
| 4,335,773 A | 6/1982 | Masi | |
| 5,033,786 A | 7/1991 | Bickford | |
| 5,165,188 A | 11/1992 | Tsiros | |
| 5,443,923 A * | 8/1995 | Laniado et al. ............ 428/476.1 |
| D393,560 S | 4/1998 | Adams | |
| 5,788,317 A | 8/1998 | Nation | |
| 5,826,284 A * | 10/1998 | Wren ............................... 4/609 |
| 6,135,193 A | 10/2000 | Lloyd | |
| 6,179,038 B1 * | 1/2001 | Eskandry ................ 160/370.21 |
| 6,374,896 B1 * | 4/2002 | M.o slashed.ller ........ 160/121.1 |
| 6,401,794 B1 * | 6/2002 | Hamilton ..................... 160/243 |
| 6,470,950 B2 * | 10/2002 | Shimizu ..................... 160/121.1 |
| 6,695,381 B2 | 2/2004 | Schlecht et al. | |
| 6,840,562 B2 | 1/2005 | Schlecht et al. | |
| 2004/0040672 A1 | 3/2004 | Nagar | |
| 2011/0017412 A1 * | 1/2011 | Macneil .................. 160/370.21 |

* cited by examiner

*Primary Examiner* — Katherine W Mitchell
*Assistant Examiner* — Jeremy Ramsey
(74) *Attorney, Agent, or Firm* — Fay Sharpe LLP

(57) ABSTRACT

A sunshade for regulating the entry of light into the interior of a vehicle. The sunshade includes a wind-up mechanism engaging a primary sheet. A secondary sheet is secured to the primary sheet. The primary sheet has a first end remote from the wind-up mechanism, the first end having a surface with a light reflecting value (A). The primary sheet has a second end adjacent the wind-up mechanism, the second end having a surface with a light reflecting value (B) which is greater or lesser than the light reflecting value (A). The secondary sheet has a first side facing the first end of the primary sheet, the first side having a surface with a light reflecting value substantially equal to value (A). The second side of the secondary sheet faces the second end of the primary sheet and has a surface with a light reflecting value substantially equal to value (B).

20 Claims, 2 Drawing Sheets

SUNSHADE

This disclosure relates to a sunshade. More particularly, the disclosure relates to a sunshade having selectively adjustable light reflective properties. For purposes of this disclosure, the term "sunshade" refers to a screen that is typically used to shade an associated window.

It is common to shade windows from the entry of light and there are many reasons for doing so, including for temperature control, privacy, glare control and protection from damage caused by UV radiation. Shading can be achieved by the application of window coverings such as drapery, curtains, window shades, blinds, and similar extra-window devices. These systems to not generally allow a vehicle occupant to select between light absorbing and light reflecting characteristics. Another common method of window shading is the application of a light absorptive or reflective film to an otherwise transparent or translucent window. Such films typically adhere to an existing pane and may contain many different optical properties, depending upon the application. Again, these films do not typically allow for changing between a light absorbing and a light reflecting condition. Alternatively, glazing materials may be applied to a window to reduce the entry of heat and light producing radiation. Special glazings may vary the amount of light that passes, as taught in U.S. Pat. No. 5,822,107 which shows an electrochromic glazing which permits the user, by applying an electrical current, to cause the glazing to pass from one degree of coloration to another. This is an expensive adjustment mechanism to allow vehicle shading.

SUMMARY OF THE DISCLOSURE

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one embodiment, a sunshade for regulating the entry of light into the interior of a vehicle is provided. The sunshade includes a wind-up mechanism engaging a primary sheet. The sheet has a first surface and an opposed second surface with a secondary sheet secured to the first surface. The secondary sheet is rotatable around its point of securement to the primary sheet to allow the secondary sheet to selectively overlap either the end of the primary sheet adjacent the wind-up mechanism or the end remote from the wind-up mechanism. The primary sheet has a first end wherein the first surface has a light reflecting value (A) and a second end wherein the first surface has a light reflecting value (B) which is greater or lesser than the light reflecting value (A). The secondary sheet has one side facing the first end wherein the surface has a light reflecting value substantially equal to light reflecting value (A). The opposed surface of the secondary sheet faces the second end of the primary sheet and has a light reflecting value substantially equal to light reflecting value (B).

According to another embodiment, a window shade having a first sheet with a first portion that is substantially light reflective and a second portion that is substantially light absorbing is provided. A line of demarcation exits at the intersection of the first and second portions. A second sheet is attached to the first sheet generally along the line of demarcation. The second sheet has a substantially light reflective side and a substantially light absorbing side. The second sheet is rotatable about the line of demarcation such that the sunshade selectively has one of a light reflective surface and a light absorbing surface.

According to a further embodiment, there is disclosed a method of controlling the temperature of a passenger compartment of an automotive vehicle by operation of the window shade discussed above.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE PREFERRED EMBODIMENTS

Figure 1:
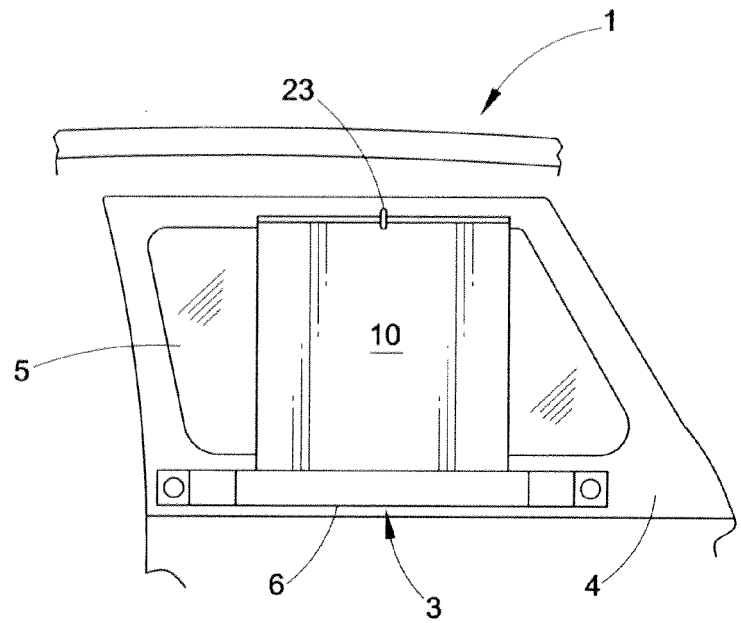
FIG. 1 is a perspective view of the sunshade within an automotive vehicle.

One or more embodiments or implementations are hereinafter described in conjunction with the drawings, where like reference numerals are used to refer to like elements throughout, and where the various features are not necessarily drawn to scale.

Referring now to FIG. 1, the interior of an automobile vehicle 1 is shown in which a sunshade 3 is mounted on a mainly vertical plane or surface such as a door frame 4 parallel to the lower edge of a side window 5. More particularly, the sunshade 3 includes a wind-up mechanism mounted to door frame 4. As illustrated, the sunshade 3 is shown in its extended position wherein screen 10 has been deployed from the wind-up mechanism to shade the window 5.

Figure 2:
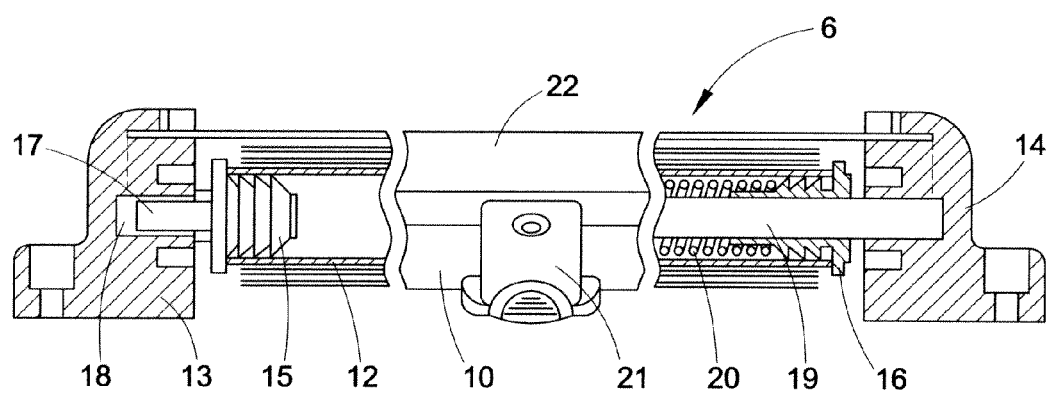
FIG. 2 is a detailed view of the sunshade mount.

Referring now to FIG. 2, primary sheet 10 is connected at one end to a wind-up shaft consisting of a tubular shaft 12 carried and rotating on end supporting elements 13 and 14 by means of plugs 15 and 16 fitted into the ends of tubular shaft 12. Plug 15, has a pin 17 protruding coaxially to tube 12, which penetrates a hole 18 in the corresponding supporting element 13. Plug 16 has a pass-through hole for an inside shaft 19, one end of which is connected to the other supporting element 14.

One side of a helical spring 20 is connected to the inner end of shaft 19 and the other to the tubular shaft 12, for example through plug 16. In this way, giving spring 20 a suitable preload during assembling, this spring 20 acts on tubular shaft 12 in the direction in which flexible sheet 10 is wound.

A tongue 21, connected to the opposite edge of sheet 10, is used as a grip element when unwinding the curtain, and engages a hook element 23 (FIG. 1) fastened to the upper edge of the window. When wound on shaft 12, curtain sheet 10 is protected by a casing which surrounds only a part of said shaft. In particular, it will be noted that the casing shown is composed of a tile-shaped or semicircular shaped element 22, secured between supporting elements 13 and 14 parallel to winding-up shaft 12. It is noted that there is no limitation on what style of wind-up mechanism is used with the sunshade described herein below.

Figure 3:
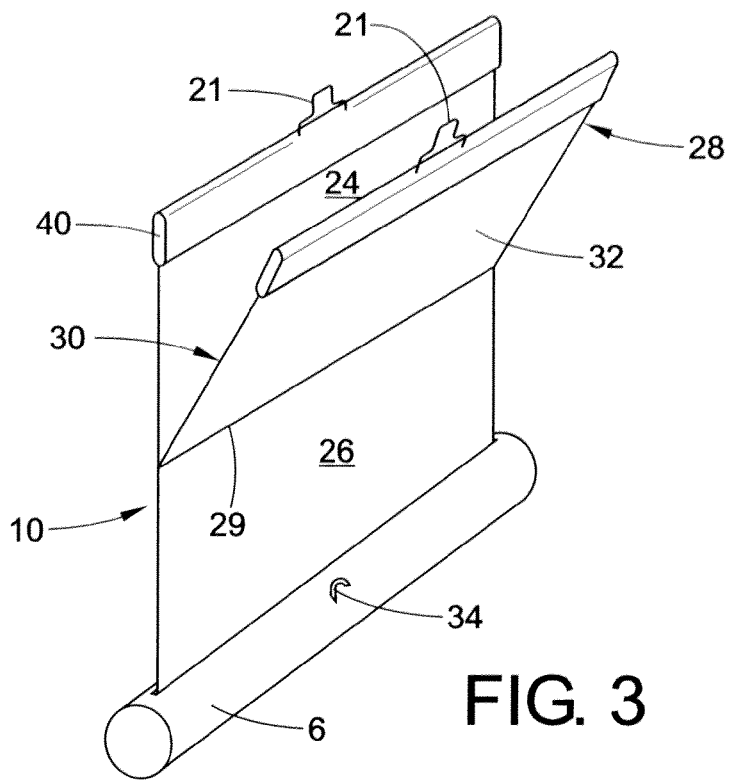
FIG. 3 is perspective view of the sunshade.
Figure 4:
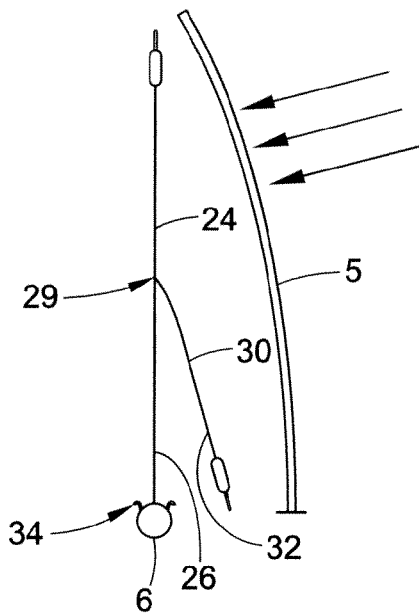
FIG. 4 is an end view of the sunshade in heating mode.
Figure 5:
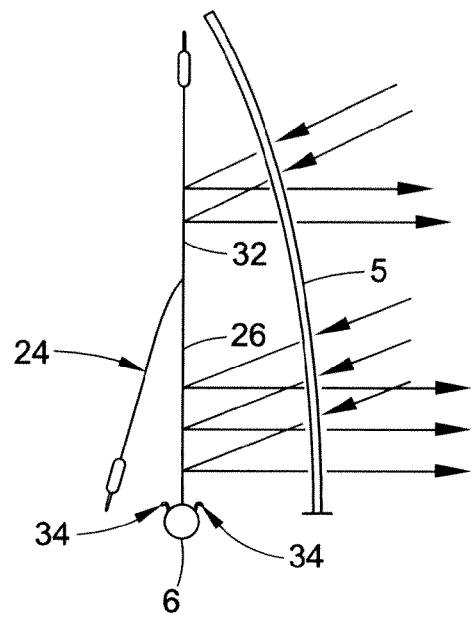
FIG. 5 is an end view of the sunshade in a cooling mode.

Referring now to FIGS. 3-5, primary sheet 10 is extended from wind-up mechanism 6. Primary sheet 10 includes a first end 24 remote from window mechanism 6 and a second end 26 adjacent wind-up mechanism 6. A secondary sheet 28 is secured to primary sheet 10 along a line 29 that generally bisects the length of primary sheet 10. The primary and secondary sheets can be comprised of any material used in the manufacture of curtains including, for example, fabric or polymeric sheeting. The secondary sheet can be secured to the primary sheet by any suitable mechanism including, for example, sewing, heat melding or adhesive. In addition, the sheets could be extruded as an integral unit.

Secondary sheet 28 is rotatable around the point of securement to primary sheet 10. Secondary sheet 28 includes a first side 30 and an opposed second side 32. Secondary sheet 28 can be rotated upwardly such that first side 30 faces first end 24. Similarly, second sheet 28 can be rotated downwardly such that second side 32 faces second end 26 of primary sheet 10. First end 24 and first side 30 are selected to be of a compatible light reflecting value. In the depicted embodiment first end 24 and first side 30 are black. Second end 26 and second side 32 also have a compatible light reflecting value. In the depicted embodiment, second end 26 and second side 32 are silver. The color or reflectivity can be achieved by any means known to the skilled artisan including, for example, coloring of the sheet material or coating thereof.

Generally, the secondary sheet is secured to the primary sheet along a line of demarcation 29 between the light absorbing portion of the primary sheet and light reflecting portion. The line of demarcation can generally bisect the length of the primary sheet. In such an embodiment, the secondary sheet can have a length about one half the length of the primary sheet.

Hook elements 34 are provided on the wind-up mechanism 6 to permit securing secondary sheet 28 in a down position exposing first end 24 and first side 30 to the external environment. A second hook element can be provided on the opposed side of the wind-up mechanism 6 to allow first end 24 of primary sheet 10 to be stowed when secondary sheet 28 is in its upward position and secured to hook 23 (see FIG. 1). Alternatively, both primary sheet 10 and secondary sheet 28 can be secured to hook 23 in an overlapping condition.

A weight bar 40 is fixed to the leading end of primary sheet 10 and the free end of secondary sheet 28. The weight bar 40 can prevent the sheets from being pulled in the wind-up mechanism. The weight bar 40 also can make the sheets easier to manipulate.

As shown in FIG. 4, when secondary sheet 28 is upwardly rotated such that second side 32 overlaps second end 26, the surface of the sunshade 3 exposed to exterior light is comprised of the black surfaces of first end 24 and first side 30. In this mode, the sunshade becomes increasingly light absorptive and as such heat generating.

As shown in FIG. 5, when first end 24 of primary sheet 10 is downwardly rotated and secondary sheet 28 upwardly rotated, the outward facing surface of the sunshade 3 is comprised of second end 26 and second side 32. In this architecture, sunshade 3 has a reflective silver surface facing the window 5 such that exterior light is reflected and the vehicle remains relatively cooler.

The disclosure has been described with reference to the preferred embodiments. Modifications and alterations will occur to others upon reading and understanding this specification. It is intended to include all such modifications and alterations in so far as they come within the scope of the appended claims or the equivalents thereof.

Having thus described the invention, we claim:

1. A sunshade for regulating the entry of light into the interior of a vehicle comprising:

a wind-up mechanism engaging a primary sheet having a first surface and a second surface, a secondary sheet including an edge secured to the first surface of the primary sheet, the primary sheet having a first end remote from the wind-up mechanism, the first surface of the first end of the primary sheet having a first light reflecting value (A), the primary sheet having a second end adjacent the wind-up mechanism, the secondary sheet being rotatable between overlap with said first end of the primary sheet or overlap with said second end of the primary sheet, the first surface of the second end of the primary sheet having a second light reflecting value (B) which is greater or lesser than the first light reflecting value (A), said secondary sheet having a first side facing the first end of the primary sheet, the first side of the secondary sheet having a surface with a third light reflecting value substantially equal to the first light reflecting value (A) and a second side facing the second end of the primary sheet, the second side of the secondary sheet having a surface with a fourth light reflecting value substantially equal to the second light reflecting value (B).

2. The window shade of claim 1 including a line of demarcation between said first end of the primary sheet and said second end of the primary sheet.

3. The window shade of claim 2 wherein said secondary sheet is secured to said primary sheet substantially along the line of demarcation.

4. The window shade of claim 3 wherein said line of demarcation generally bisects a length of said primary sheet.

5. The window shade of claim 4 wherein said secondary sheet has a length about one half the length of said primary sheet.

6. The window shade of claim 1 wherein said first surface of the first end of the primary sheet is black.

7. The window shade of claim 6 wherein said first surface of the second end of the primary sheet is reflective.

8. The window shade of claim 6 wherein the surface of said first side of the secondary sheet is black.

9. The window shade of claim 7 wherein the surface of said second side of the secondary sheet is reflective.

10. The window shade of claim 9 wherein said reflective surface is silver.

11. The window shade of claim 1 wherein said surface comprises a coating.

12. The window shade of claim 1 further including at least one hook element disposed on said wind-up mechanism.

13. The window shade of claim 1 wherein said wind-up mechanism comprises a spring biased shaft.

14. The window shade of claim 1 wherein said secondary sheet includes a free end.

15. A window shade comprised of a first sheet, said sheet having a first portion that is substantially light reflective and a second portion that is substantially light absorbing, a line of demarcation being formed at an intersection of said first and second portions between first and second ends of the first sheet, a second sheet attached to said first sheet generally along the line of demarcation, said second sheet having a substantially light reflective side and a substantially light absorbing side, said second sheet being rotatable about the line of demarcation such that the sunshade selectively has one of a light reflective surface and a light absorbing surface.

16. The window shade of claim 15 wherein said first portion is silver and said second portion is black.

17. The window shade of claim 15 wherein said line of demarcation generally bisects a length of said first sheet.

18. The window shade of claim 17 wherein said second sheet has a length about one half the length of said first sheet.

19. The window shade of claim 15 including a hook for securing an edge of said second sheet remote from where the secondary sheet is attached to said first sheet.

20. A method of effecting temperature within a passenger compartment of an automotive vehicle comprising providing a window shade including a first sheet, said sheet having a first portion that is substantially light reflective and a second portion that is substantially light absorbing, a line of demarcation being formed at an intersection of said first and second portions between first and second ends of the first sheet, a second sheet attached to said first sheet generally along the line of demarcation, said second sheet having a substantially light reflective side and a substantially light absorbing side, said second sheet being rotatable about the line of demarcation such that the sunshade selectively has one of a light reflective surface and a light absorbing surface, and positioning said second sheet to achieve one of a reflective state when a cooler environment is desired and a light absorbing state when a warmer environment is desired.

* * * * *